United States Patent
Flyborg

(10) Patent No.: US 10,878,678 B2
(45) Date of Patent: Dec. 29, 2020

(54) METHOD AND SYSTEM FOR CONTROLLING CAMERAS

(71) Applicant: Axis AB, Lund (SE)

(72) Inventor: Jan Flyborg, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/715,659

(22) Filed: Dec. 16, 2019

(65) Prior Publication Data

US 2020/0193788 A1 Jun. 18, 2020

(30) Foreign Application Priority Data

Dec. 18, 2018 (EP) .................................. 18213342

(51) Int. Cl.
| | | |
|---|---|---|
| *G08B 13/196* | (2006.01) | |
| *H04L 29/12* | (2006.01) | |
| *H04N 5/232* | (2006.01) | |
| *H04N 7/18* | (2006.01) | |

(52) U.S. Cl.
CPC .... *G08B 13/19656* (2013.01); *H04L 61/2514* (2013.01); *H04N 5/23206* (2013.01); *H04N 7/181* (2013.01)

(58) Field of Classification Search
None
See application file for complete search history.

(56) References Cited

U.S. PATENT DOCUMENTS

2010/0217814 A1* 8/2010 Strueber ............... G06Q 10/10
709/206
2013/0258119 A1 10/2013 Kim et al.
2015/0022666 A1* 1/2015 Kay ..................... H04L 65/4084
348/159
2015/0281294 A1 10/2015 Nur et al.
2016/0277486 A1 9/2016 Chen

FOREIGN PATENT DOCUMENTS

| CN | 102014122 A | 4/2011 |
|---|---|---|
| WO | 2008/127194 A1 | 10/2008 |
| WO | 2010/016059 A1 | 2/2010 |

OTHER PUBLICATIONS

Extended European Search Report dated Jul. 3, 2019 for the European Patent Application No. 18213342.1.

* cited by examiner

*Primary Examiner* — James M Anderson, II
(74) *Attorney, Agent, or Firm* — Volpe Koenig

(57) ABSTRACT

A method for remotely controlling a networked video camera includes sending an instruction message for the video camera, from the client to a communication controller, and determining whether the message is a candidate for being sent via a peer-to-peer connection.

In response to the instruction message being determined not to be a candidate for being sent via a peer-to-peer connection, sending the instruction message from the communication controller to a camera control service, logging at the camera control service at least a portion of the instruction message, and sending the instruction message received at the camera control service from the camera control service to the video camera via the communication network.

In response to the instruction message being determined to be a candidate for being sent via a peer-to-peer connection, the method further includes sending the instruction message via a peer-to-peer connection.

9 Claims, 8 Drawing Sheets

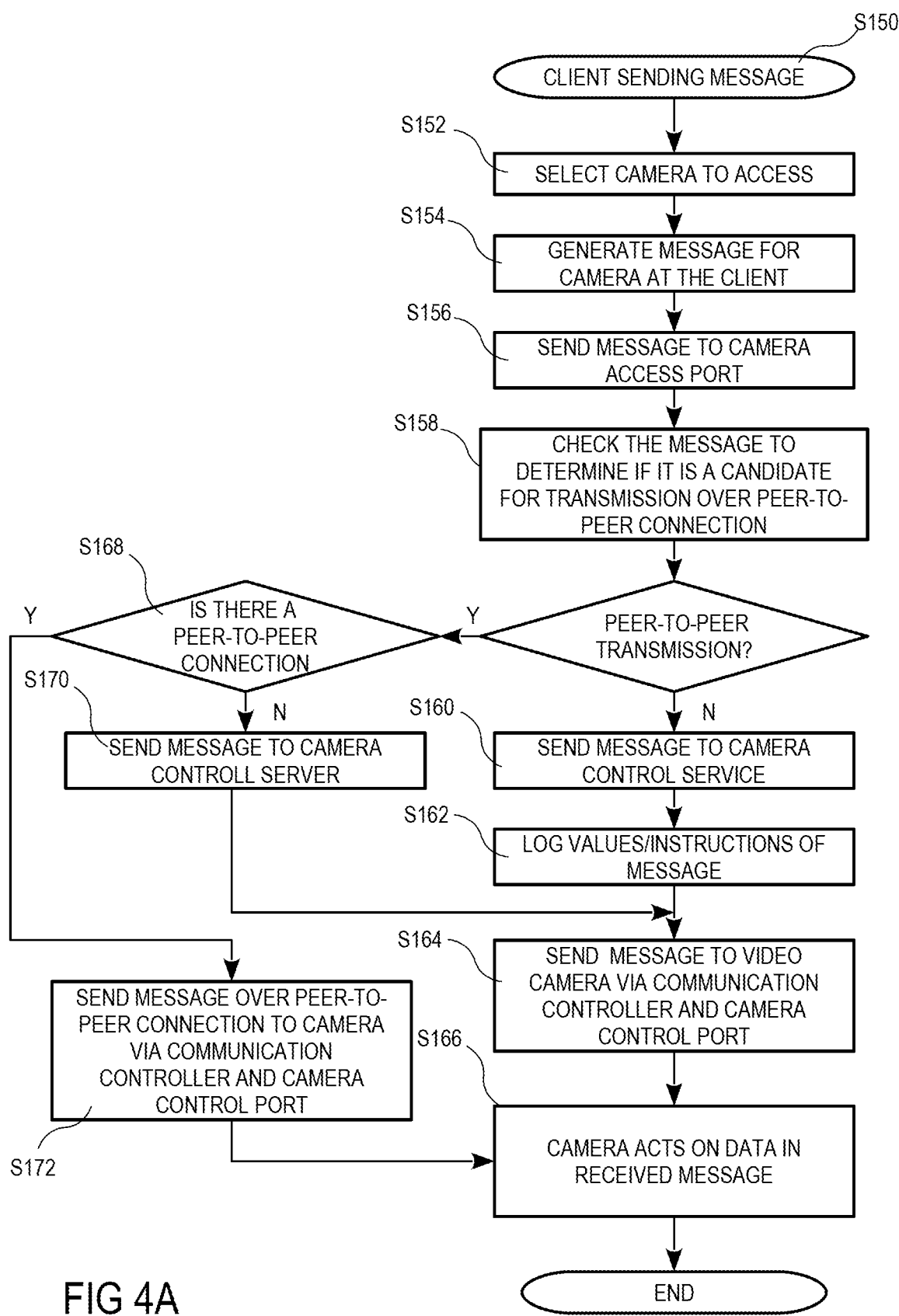

METHOD AND SYSTEM FOR CONTROLLING CAMERAS

TECHNICAL FIELD

The present invention relates to method for remotely controlling a networked video camera and a networked video monitoring system.

BACKGROUND

Networked and IP-based camera systems for monitoring or surveillance is increasingly common. These camera systems may be arranged to monitor or survey premises, production processes, production areas, geographic areas, traffic, events, etc. The number of cameras in monitoring and/or surveillance systems increases and, thus, the managing of the cameras, the camera streams, and video records becomes more cumbersome all the time. One obstacle in the systems is that many systems only have one or a few video management devices and these are connected directly to the IP address of each camera. Thereby the management of the video cameras of the video system becomes quite rigid and not easily operated from wherever it is needed.

In order to make the video systems more accessible, without compromising the security, cloud-based services have been introduced and allow the user to remotely handle, control and monitor camera systems. Cloud based services are commonly implemented on servers managed by a third party who is charging for network traffic relating to the services. For reasonable data amounts and for well-founded reasons it may be worth the cost in order to achieve the freedom of the cloud-based system.

However, in camera systems there are often streamed a very large amount of data, e.g. video data from several cameras at high resolution and high framerate, and at most of the time, when it comes to video data, the only reason to stream the data is to enable live view from specific cameras. Another drawback using the cloud-based system may be increased latency. In particular this becomes a problem when a user wants to control functions of a camera from which the control by the user rely on substantially instant feedback, e.g. panning the camera, tilting the camera, and zooming in or out.

Accordingly, there is a need for a system exploiting the advantages of a cloud-based system and reducing the effects of the disadvantages.

SUMMARY

According to one aspect a method for remotely controlling a networked video camera from a client via a communication network comprises sending an instruction message, intended for the video camera, from the client to a communication controller arranged at the client, and determining at the communication controller arranged at the client whether the instruction message is a candidate for being sent to the video camera via a peer-to-peer connection or not.

In response to the instruction message being determined not to be a candidate for being sent to the video camera via a peer-to-peer connection, the method further including: sending the instruction message from the communication controller arranged at the client over the communication network to a camera control service, logging at the camera control service at least a portion of the instruction message, and sending the instruction message received at the camera control service from the camera control service to the video camera via the communication network.

In response to the instruction message being determined to be a candidate for being sent to the video camera via a peer-to-peer connection, the method further including, sending the instruction message from the communication controller arranged at the client to a communication controller arranged at the video camera via a peer-to-peer connection between the two communication controllers over the communication network, and sending the instruction message received by the communication controller at the video camera from the communication controller at the video camera to the video camera.

Further, the method comprises receiving at the video camera the instruction message via one of the control service or the peer-to-peer connection and performing at the video camera the instruction in the instruction message.

Determining the type of communication that a message sent includes, and depending on the nature of the communication using different communication paths, enables the advantages of a cloud-based, or similar, system and permits decreasing the risk of high costs and latency related problems in controlling the video camera. The decrease in risk of higher costs is a result of the peer-to-peer connection bypassing the cloud-based services, which may have costs associated with the data traffic of the service. Further, the peer-to-peer connection will in a majority of cases be a substantially more direct communication path to a video camera and there is no service in the middle to manage the communication. Hence, the latency over the peer-to-peer connection will in most cases be much less than the latency via a cloud-based or similar service.

The communication controller arranged at the client may be directly connected to the client and would thereby connect the client to the communication network. This facilitates determining the type of message in communication from the client.

The communication controller arranged at the video camera is directly connected to the video camera and is connecting the video camera to the communication network. This facilitates determining of the type of message in communication from the video camera.

In some embodiments the method further comprises sending an access request requesting access to the video camera, the access request is sent from the client to a user authorization service via the communication network, checking at the user authorization service if the client is authorized to access the requested video camera, sending, in response to the access of the video camera being authorized, an instruction message from the user authorization service to the communication controller arranged at the client instructing this communication controller to setup a camera access port for communication between the client and the video camera, and initiating, in response to the access of the video camera being authorized, setup of a peer-to-peer connection between the camera access port and a camera control port in the communication controller arranged at the video camera. Having an authorization process accessible via the network makes it possible to centralise the authorization process and facilitating authorised access to video cameras in a video camera system. Moreover, by setting up the peer-to-peer connection in connection with the access request will decrease the risk of delays in requests including time critical instructions, e.g. pan, tilt, zoom, or in video requests as the likelihood of the peer-to-peer connection being established when the user makes those types of request is much higher than if the setup is initiated when the request is made. Setting up a camera access port in the communication controller for communication between the video camera and the client simplifies communication requirements at the client, as the client only has to know one way to access the video camera, i.e. the client accesses the port as if it was the video camera. This makes it possible to the presently presented video system using existing Video Management Systems in the client, i.e. Video Management Systems not specially designed for multiple communication paths selectable based on type of communications and/or message sent.

Further, the sending of an instruction message, intended to the video camera, from the client may include the client addressing the instruction message, intended to the video camera, to an IP-address identifying the camera access port. The client may communicate with this IP-address as if it was the address of the camera and still experience performance improvements.

According to some embodiments the method further comprises in response to the instruction message received at the video camera being a video request performing the following steps:

sending video data messages from the video camera to the communication controller arranged at the video camera;

determining at the communication controller arranged at the video camera that each video data message is a candidate for being sent to the client via a peer-to-peer connection, sending each video data message received at the communication controller arranged at the video camera via the peer-to-peer connection to the communication controller arranged at the client, sending each video data message received at the communication controller arranged at the client to the client for further processing.

Having a communication controller at the camera as well permits the communication controllers to be added to any existing system and provide the functionality and advantages of selectively using the communication path to the camera control service and the peer-to-peer connection. Moreover, the video camera does not have to be adapted or adjusted in order to exploit the advantages of this video system.

Further, instruction messages not being candidates for being sent over the peer-to-peer connection may include at least one of the types of data from the group of: frame rate settings, aperture size settings, and gain settings. Instruction messages being candidates for being sent over the peer-to-peer connection may include at least one of the types of data from the group of: video data, image data, pan adjustments, tilt adjustments, and zoom adjustments. Moreover, the camera control service may be a process running on a server accessible via the communication network.

According to another aspect a networked video monitoring system comprises:

a video camera connected to a communication network via a communication controller arranged at the video camera;

a client arranged to manage video data from video cameras accessed via the communication network the client being connected to the communication network via a communication controller arranged at the client;

a camera control service arranged to log instructions sent to the camera, the camera control service is implemented in a server connected to the communication network; and the communication controller arranged at the client being arranged to determine whether an instruction message sent from the client and addressed to the video camera is a candidate for being sent to the camera via a peer-to-peer connection or not, being arranged to send each instruction message determined not to be a candidate for being sent via the peer-to-peer connection to the camera control service, and being arranged to send each instruction message determined to be a candidate for being sent via the peer-to-peer connection to the video camera via the peer-to-peer connection.

Determining the type of communication that a message sent includes and, depending on the nature of the communication, using different communication paths enables the advantages of a cloud-based, or similar, system while still decreasing the risk of higher costs and latency related problems in controlling the video camera. The decrease in risk of higher costs is a result of the peer-to-peer connection bypassing the cloud-based services, which may have costs associated with the data traffic of the service. Further, the peer-to-peer connection will in a majority of cases be a substantially more direct communication path to a video camera and there is no service in the middle to manage the communication. Hence, the latency over the peer-to-peer connection will in most cases be much less than the latency via a cloud-based or similar service. Having a communication controller at the camera as well as at the client permits the communication controllers to be added to any existing system and provide the functionality and advantages of selectively using the communication path to the camera control service and the peer-to-peer connection. Moreover, the video camera does not have to be adapted or adjusted in order to exploit the advantages of this video system.

In some embodiments the communication controller arranged at the video camera is arranged to determine whether a message sent from the video camera and addressed to the client is a candidate for being sent to the client via the peer-to-peer connection or not, is arranged to send each message determined not to be a candidate for being sent via the peer-to-peer connection to the camera control service, and is arranged to send each message determined to be a candidate for being sent via the peer-to-peer connection to the client via a peer-to-peer connection.

A further scope of applicability will become apparent from the detailed description given below. However, it should be understood that the detailed description and specific examples, while indicating preferred embodiments, are given by way of illustration only, since various changes and modifications within the scope will become apparent to those skilled in the art from this detailed description. Hence, it is to be understood that is the embodiments are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages will become apparent from the following detailed description of a presently preferred embodiment, with reference to the accompanying drawings, in which FIG. 4A is a flowchart showing a process of a client sending various types of messages to a specific video camera.

Further, in the figures, like reference characters designate like or corresponding parts throughout the several figures.

DETAILED DESCRIPTION OF EMBODIMENTS

Figure 1:
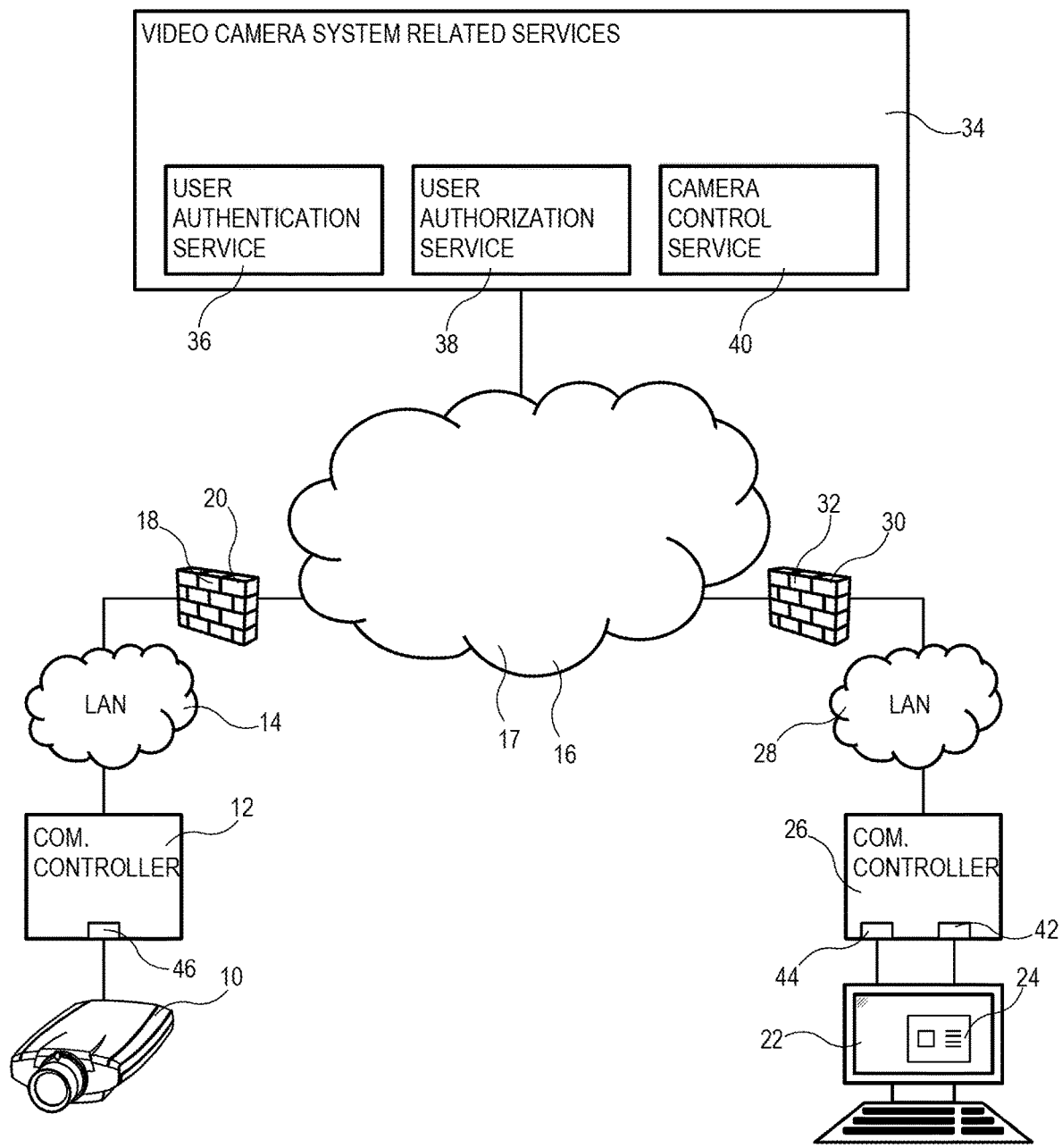
FIG. 1 is a block diagram of a video camera system.

The present embodiments relate to systems and methods for remotely controlling video cameras from a client and viewing video captured by the video cameras. Now referring to FIG. 1, a system according to an embodiment may include a video camera 10 being connected to a communication controller 12 arranged at the video camera 10. The video camera may be any network connected video camera, e.g. a surveillance camera, a monitoring camera, a camera arranged in a door station for capturing images of a person requesting access to a closed of area, etc. The communication controller 12 may be a device external to the video camera 10, a device built in to the video camera 10, or software code running in an external device 12 or running internally in the camera 10. Communication to and from the video camera 10 passes through the communication controller 12. The video camera 10 is being connected to a local communication network 14, i.e. a Local Area Network 14 (LAN), via the communication controller 12. The LAN 14 is then connected to a larger communication network 16, i.e. a Wide Area Network 16 (WAN), via a Network Address Translator 18 (NAT) and/or a Firewall 20. The WAN 16 is part of the Internet 17.

Further, the system includes a client 22 running a camera management software 24, e.g. a Video Management System. The client 22 is connected to a communication controller 26 arranged at the client 22. The communication controller 26 may be a device external to the client 22, a device built in to the client 22, or software code running in an external device 26 or running internally in the client 22. Communication to and from the client 22 passes through the communication controller 26. The client 22 is being connected to a local communication network 28, i.e. a Local Area Network 28 (LAN), via the communication controller 26. The LAN 28 is then connected to the WAN 16 via a NAT 30 and/or a Firewall 32. The WAN connected to the LAN 28 including the communication controller 26 at the client 22 may be the same WAN 16 as the one connected to the LAN 14 including the communication controller 12 at the video camera 10 or it could be a totally different WAN. However, independent of whether the WAN is the same or not the two LANs 14, 28, are connected to the same Internet 17.

Connected to the Internet 17 are at least a couple of video camera system related services 34. These video camera system related services 34 includes a user authentication service 36, a user authorization service 38, and a camera control service 40. The video camera system related services 34 may be implemented as cloud services. Cloud services are a service made available to users on demand via the Internet from a server of a cloud computing provider, e.g. Amazon. The video camera system related services 34 may also be implemented on servers dedicated for the video camera system related services, e.g. servers of a surveillance company, servers of the occupants of the premises of which the video is captured, servers of a video camera system installing company, etc.

The user authentication service 36 is arranged to authenticate users or operators accessing the system including the camera in order to confirm that they really are who they say they are. The user authorization service 38 is then arranged to authorize use of specified operations, access to specified devices and/or functions, etc., which operations, devices, and functions are accessible via the Internet. The camera control service 40 is arranged to provide access to video cameras registered at the camera control service 40. The access provided is related to configuration of cameras, setting specific parameters of the camera, requesting pan, tilt, or zoom changes for the camera, and streaming of video for viewing or recording. The camera control service 40 is also arranged to log changes to configuration and/or parameters of each camera registered, and to instruct the cameras to perform such changes. Hence, the camera control service 40 is enabled to send instructions and data to the registered cameras and receive instructions from authorized users or operators and their client.

Figure 3:
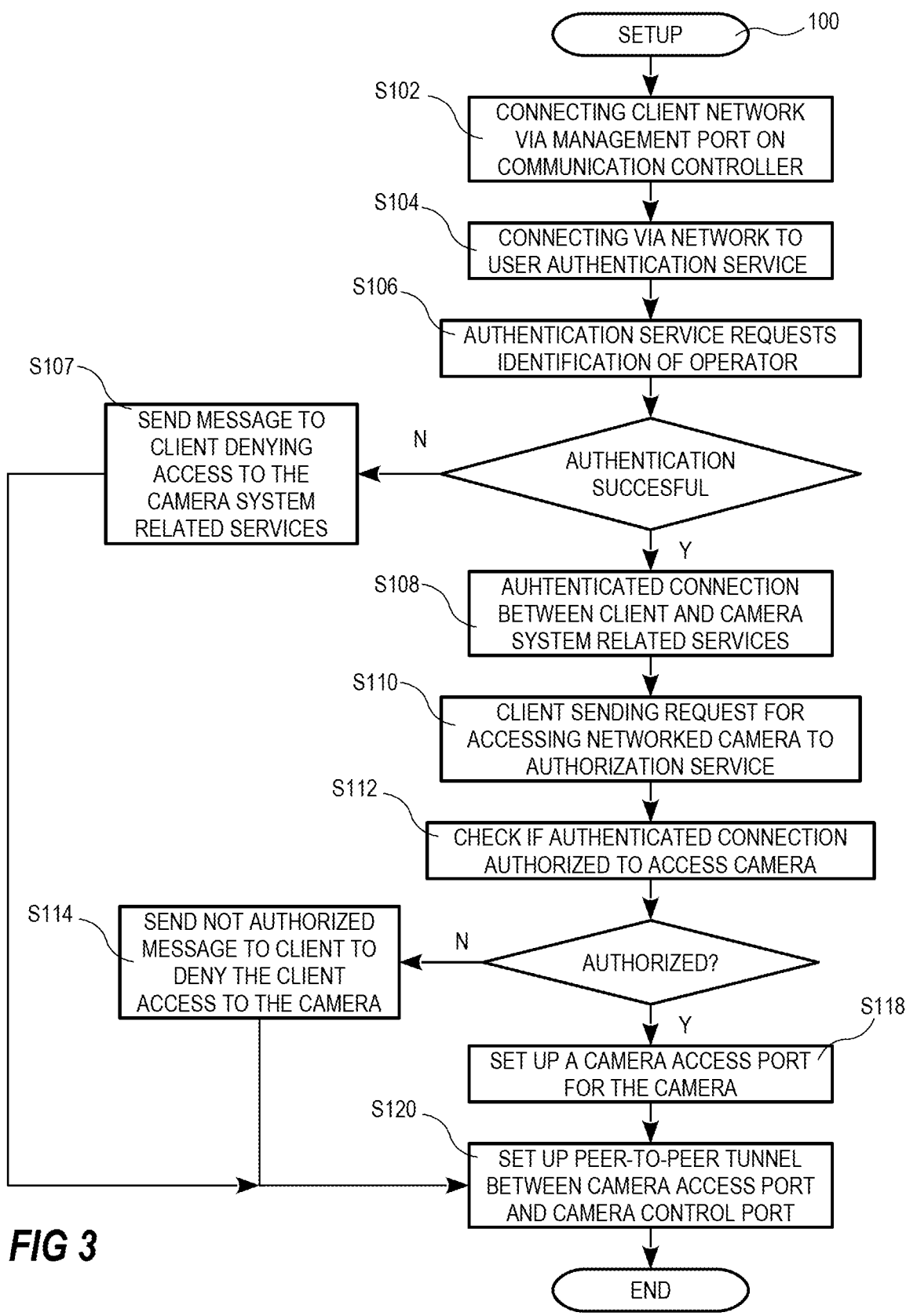
FIG. 3 is a flowchart showing a process of a client setting up communications to a video camera according to some embodiments.

Now referring to FIGS. 1 and 3, a process S100 according to an embodiment includes connecting the client 22 running the camera management software 24 to the network 28,16 via a logical port 42, on the communication controller 26, S102. This connection may be automatically created when the client is physically connecting to the communication controller 26 and is checking for network connections. This logical port 42 is configured for managing communication between general functions of the video camera system related service 34 and the client 22 running the camera management software 24. Upon connection of the camera management client 22 to the management port 42 on the communication controller 26 the client 22 will be connected to the user authentication service 36 via this management port 42, S104. The authentication service 36 then requests the client 22 to identify itself, e.g. the user of the client may key in a user identity and some kind of password, S106.

If the authentication is not successful, no access to the rest of the video camera system related services 34 is given and the failed authentication is conveyed to the client 22 and the user, S107. If the authentication is successful, then the management port 42 in the communication controller 26 and a status of the connection between the client 22 and the video camera system related services 34 is set to being authenticated, S108. It may also be seen as the management port 42 of the communication controller 26 is authenticated and is allowed to connect to the video camera system related services 34.

An operator or user of the client 22 then requests access to the networked video camera 10 by sending a request for camera access to the video camera system related services 34 and in particular to the authorization service 38, S110.

The authorization service 38 checks if the authenticated connection is allowed to access the video camera 10, S112. If the authenticated connection is not authorized to access the video camera 10, the authorization service 38 returns a corresponding indication to the client 22 and the client 22 is denied access to the video camera 10, S114. If the authenticated connection is allowed to access the video camera 10 a logic port 44, hereinafter referred to as the camera access port 44, configured to provide access to the video camera 10 and its functionality is set up in the communication controller 26, S118. The camera access port 44 in the communication controller 26 may be set up as representing the IP-address of the video camera 10. In a video system including a plurality of cameras and wherein the client accesses a plurality of cameras, a camera access port 44 is configured for each video camera the client has been allowed to access. Each camera access port is unique for the camera it is related to.

For instance, an IP-address of the camera access port 44 is presented to the client 22 as being the address of the camera for which access is requested. Thus, the client will use this address for communicating with the camera. The communication with the camera may then be performed using a protocol on top of the IP protocol, e.g. HTTP. When the camera access port 44 is set up, a process of setting up a direct connection, e.g. a peer-to-peer connection, between the camera access port 44 and a camera control port 46 of the communication controller 12 at the camera 10 is started in the background, S120. A peer-to-peer connection is to be interpreted as a direct connection between two specific devices, wherein the connection is direct in the aspect of the communication not being processed and passed on by an intermediate server of some kind. Messages sent over the connection may be switched and routed via a plurality of nodes of a network, without the payload of the message being processed by any other devices than the two devices connected by the peer-to-peer connection. In the particular case described above the peer-to-peer connection is established between the two communication controllers 12 and 26, and more specifically between the camera access port 44 and the camera control port 46.

The setting up of the peer-to-peer tunnel may include an operation generally referred to as "hole punching". The "hole punching" operation is a technique commonly used for establishing a direct connection between two networked devices across, for example, fire walls and/or Network Address Translators (NAT) and processes to establish such direct connection is well known by the person skilled in the art.

The "hole punching" operation may thus be arranged to set up the peer-to-peer connection between the communication controller at the camera and the communication controller at the client running the video manager. The peer-to-peer connection to be established between the camera access port 44 and the camera control port 46 may be any kind of setup acting as a communication tunnel for communications between the camera 10 and the client 22. This operation of setting up the direct connection, i.e. the peer-to-peer connection, between the camera access port 44 and the camera control port 46 is performed independently of other camera operations and requests.

Moreover, if the peer-to-peer connection is lost for any reason, the operation of setting up the peer-to-peer connection is restarted. Such operation of setting up the peer-to-peer connection may be started by the camera control service 40 in response to the camera control service receiving an indication that the peer-to-peer connection is down. Each of the camera access port 44 and the camera control port 46 is informed when the peer-to-peer connection is available.

Now referring to FIG. 1 again, the management port 42 and the camera access port 44 of the communication controller 26 are logical ports in the communication protocols running on the communication controller. A port is an address that identifies a network-based application on a computer, in this case on the communication controller 26. In one embodiment the management port 42 is implemented as an IP-address representing the port and an HTTP API for transport of instructions, requests, and messages. The camera access port 44 is also implemented as an IP-address representing the port and an HTTP API for carrying through instructions, requests, and messages. The camera access port 44 of the communication controller 26 at the client 22 is configured to handle all instruction messages and requests for video that is addressed to the video camera 10. Further, the camera access port 44 is arranged to send all messages and requests addressed to the video camera 10 to the camera control service 40. Accordingly, instruction messages addressed to the camera 10 and sent from the client is sent to the camera access port 44 and then passed on to the camera control service 40. Further, the camera access port 44 is arranged to send the traffic addressed to the camera 10 to a corresponding camera control service 40 for logging and forwarding to the camera 10. However, when the traffic relates to a video stream or a video transmission and a peer-to-peer connection has been established between the communication controller 26 at the client 22 and the communication controller 12 at the camera 10, the traffic related to the video is sent on the peer-to-peer connection instead of being sent to the camera control service 40. The decision whether the data is being sent over the peer-to-peer connection or via the camera control service 40 in the video camera system related services 34 may be made for each packet in a stream, or the decision may be made on a level corresponding to a communication session, i.e. the video stream, an instruction transmission and its related response, etc. The setup of the peer-to-peer connection will be discussed below.

A video camera 10 in the network 14, when set up, is also set up with a communication controller 12. During setup of the camera 10 the camera control port 46 in the communication controller 12 is set up and arranged to communicate with the camera control service 40 included in the video camera system related services 34. According to some embodiments the camera control port 46 of the communication controller 12 at the camera 10 is set up during a configuration phase when the camera 10 and the communication controller 12 at the camera 10 is connected to the video camera system related services 34. The camera control port 46 may be implemented, as described above in connection with the camera access port 44, as an IP-address representing the port and an HTTP API for transport of instructions, requests, and messages. The camera control port 46 may be given set up with a specific IP-address, for addressing by the camera and the services accessing the camera, and an HTTP API for carrying through instructions, requests, and messages to and from the camera. Instruction messages from the camera control service 40 and confirmation messages from the video camera 10 are thus communicated through the camera control port 46.

According to some implementations, the process of the client 22 communicating with the camera 10 may be described as follows, see FIGS. 1 and 4A. The following description is based on a system in which the camera 10, the communication controller 12, and the camera control port 46, already are set up and ready to communicate with the camera control service 40 or the video camera system related services 34. When the setup of the camera access port 44 is completed, as described in connection with FIG. 3, the client 22 is enabled to send instruction messages, also including requests for video, to the video camera 10 via the API of the camera access port 44. In FIG. 4A a process, S150, of sending a message, e.g. an instruction message, a control message, a setup message, a configuration message, a pan instruction, a tilt instruction, a zoom instruction, a video request, etc., from the client 22 to the video camera 10 is depicted. The camera 10 that the operator or user wants to access for control or video request is selected in an interface of the client 22, S152. A message for the camera is then generated at the client, S154, e.g. based on inputs from an operator or a user and sent to the camera access port 44 of the communication controller 26 at the client 22, S156. At the camera access port 44 and the API of the camera access port 44 the message is checked, and it is determined if the message is a message that is a candidate for being sent via a peer-to-peer connection or not, S158. The type of messages that are candidates for being sent via the peer-to-peer connection may be time critical instruction messages, e.g. pan, tilt, or zoom instructions, that may suffer in performance if extensive latency is introduced. Other types of messages benefitting from the peer-to-peer connection are messages including video data or other data requiring a lot of bandwidth. However, such video messages are rarely sent from the client 22 to the camera 10.

If the message is not a candidate for being sent via a peer-to-peer connection, the message is sent to the camera control service 40, S160, where the value, operation, and/or function referred to in the message is logged, S162. Then the message is transmitted to the camera 10 via the communication controller 12 and the camera control port 46, S164. The message is then received at the camera and the value, operation, and/or function, described in the message is set, updated, activated, or executed, S166.

If the message is a candidate for being sent via a peer-to-peer connection, the camera access port 44 checks if there is an established peer-to-peer connection between the camera access port 44 and the camera control port 46, representing the requested camera 10, S168. If no such peer-to-peer connection is established, the message is sent to the camera control service 40, S170. Then the message is sent to the camera 10 via the communication controller 12 and the camera control port 46, S164, and the camera acts on the value, operation, and/or function, described in the message, S166, in the same way as for a message not being a peer-to-peer communication candidate. The communication in this latter case goes back to the process used for communications not being relevant for peer-to-peer communication because a peer-to-peer connection between the two parties is not established yet or have been temporarily lost. Hence, the messages will arrive at the camera even if the preferred communication channel is not present.

However, if the message is a candidate for being sent via a peer-to-peer connection and a peer-to-peer connection is established, S168, the message is sent over the peer-to-peer connection from the communication controller 26 and the camera access port 44 to the communication controller 12 and the camera control port 46 and then passed on to the camera, S172. Then the camera acts on the data received in the message, S166.

The above described process allows the system to relay messages sensitive for network latencies or messages representing a large data payload, e.g. video, via a direct connection without taking the detour via a video camera related service system 34 on the Internet. A detour via such a service system 34 would likely add latency to any communication and if there is a cost related to data transfers going through such a service system 34 a non-trivial added cost would be related to transfers of large amounts of data, e.g. video. However, many advantages of a service system may still be experienced due to the insightful separation of different types of messages into messages passing through the service system 34 and messages advantageously sent over a direct connection, i.e. peer-to-peer connection. Moreover, the system enables messages that preferably would be sent via the direct connection to be sent via the service system in situations where a direct connection has not been established yet or where a direct connection has failed. This failover procedure makes the system robust and less prone to data loss due to failure of one connection.

Figure 4B:
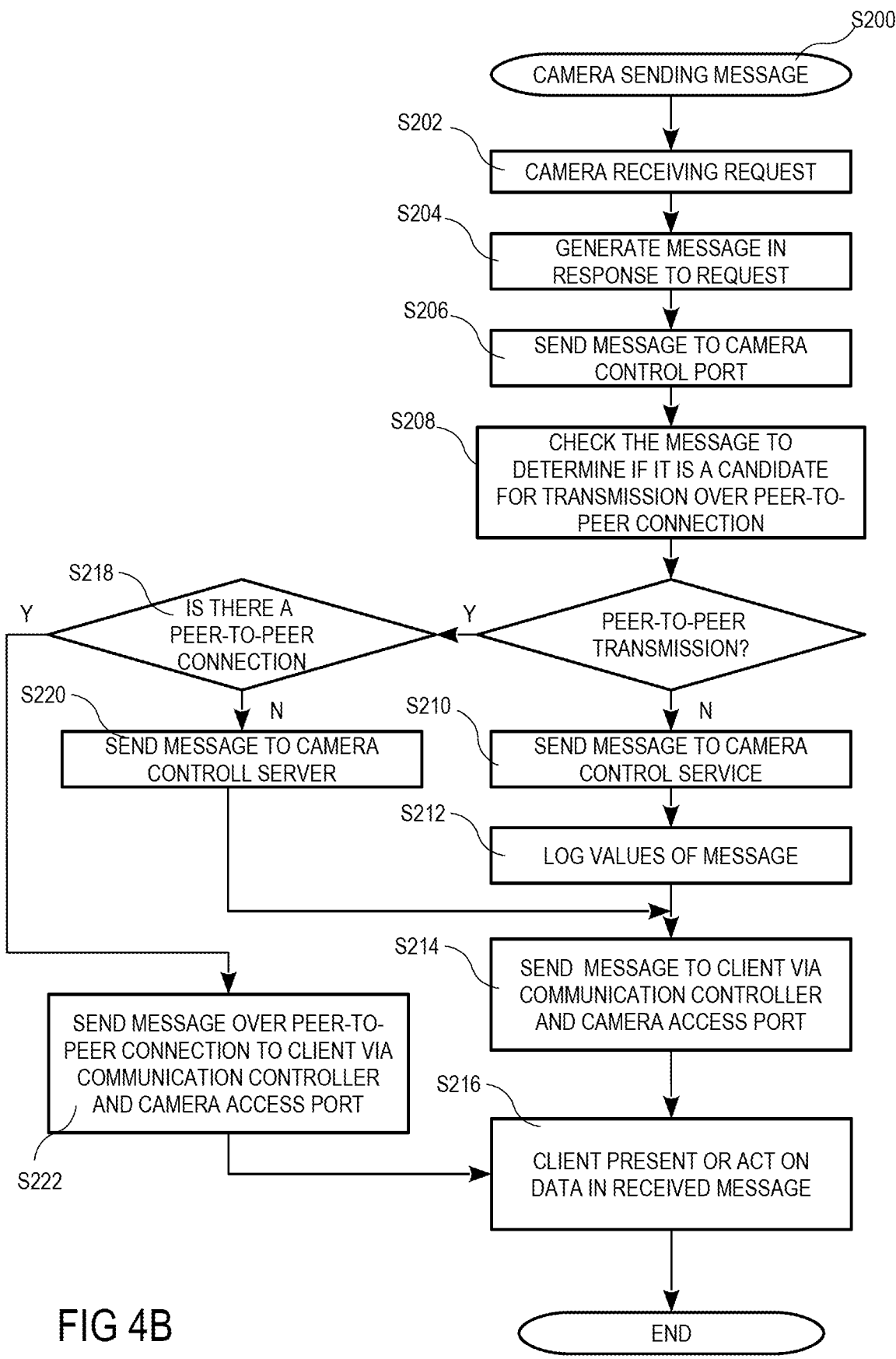
FIG. 4B is a flowchart showing a process of a video camera responding to a video request from a client.

Now referring to FIG. 4B, depicting a process for the camera 10 to send messages to the client 22. In the example in the figure we assume that the camera receives a request for data, for set up, for configuration, for a specific operation, etc., S202. However, there are message types that may be initiated by the camera in itself. The camera 10 then generates a message in response to the request, S204, and sends the message to the camera control port 46 in the communication controller 12, S206. In the camera control port 46 the message is checked in order to find out if it is a message of a type that is a candidate for transmission over a peer-to-peer connection, S208, examples of types of messages being candidates or not has been previously presented in this description.

If the message is considered not to be a candidate for peer-to-peer transmission, the message is sent on to the camera control service 40, S210, where content, e.g. a value, a parameter, an acknowledgement, etc., of the message is logged, S212. The message is then forwarded to the client 22 via the communication controller 26 and the camera access port 44, S214. At the client 22 the message is processed, and the data is handled in accordance with the type of and the actual pay load of the message received, S216.

If the message is considered to be a candidate for peer-to-peer transmission after the checking in S208, the control port transmits the message via two different paths depending on whether there is an established peer-to-peer connection to the receiving client 22 or not, S218. If no established peer-to-peer connection is present then the message is sent to the camera control service 40, S220, and then the camera control service sends the message to the client 22 via the communication controller 26 and the camera access port 44, S214. Then the client 22 processes the message, and the data is handled in accordance with the type of and the actual pay load of the message received, S216.

On the other hand, if there is an established peer-to-peer connection to the receiving client 22, then the message is sent over the peer-to-peer connection to the client 22 via the communication controller 26 and the camera access port 44, S222. Then the client 22 processes the message, and the data is handled in accordance with the type of and the actual pay load of the message received, S216.

Figure 5:
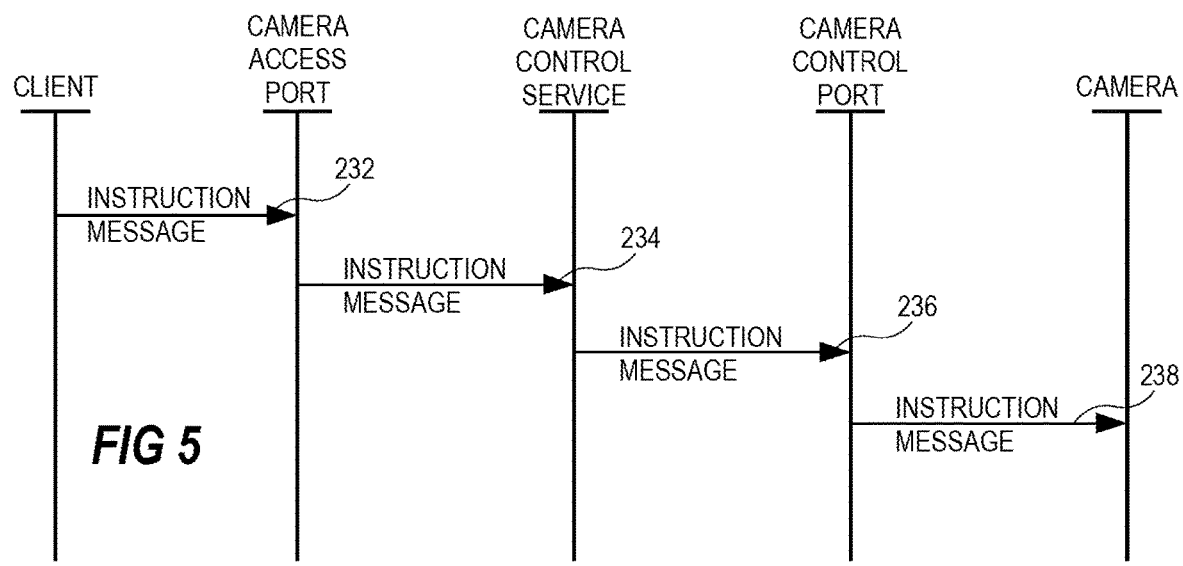
FIG. 5 is a communication diagram showing the sending of an instruction message to a video camera.

Now referring to FIG. 5 depicting a communication diagram for an instruction message being sent from the client to the camera. As described in connection with FIG. 4A an instruction message 232 generated by the client 22 and intended for the camera 10 is sent to the camera access port 44, where it is determined that it is not an instruction message being a candidate for a peer-to-peer connection. Such an instruction message may include instructions for changing the settings of a video camera. The setting that is changed may be, for example, frame rate settings, aperture size, gain, etc. Then the camera access port 44 in the communication controller 26, sends the message 234 to the camera control service 40, where data from the instruction message is logged. The instruction message 236 is then passed on to the camera control port 46 in the communication controller 12, which in turn sends the instruction message 238 to the camera 10. In this way the camera control service will enable easy access to a camera from various clients at various locations. Moreover, the video camera system related services 34 manage authentication and authorization procedures for each camera in a system of cameras and logs the settings of the cameras.

Figure 6:
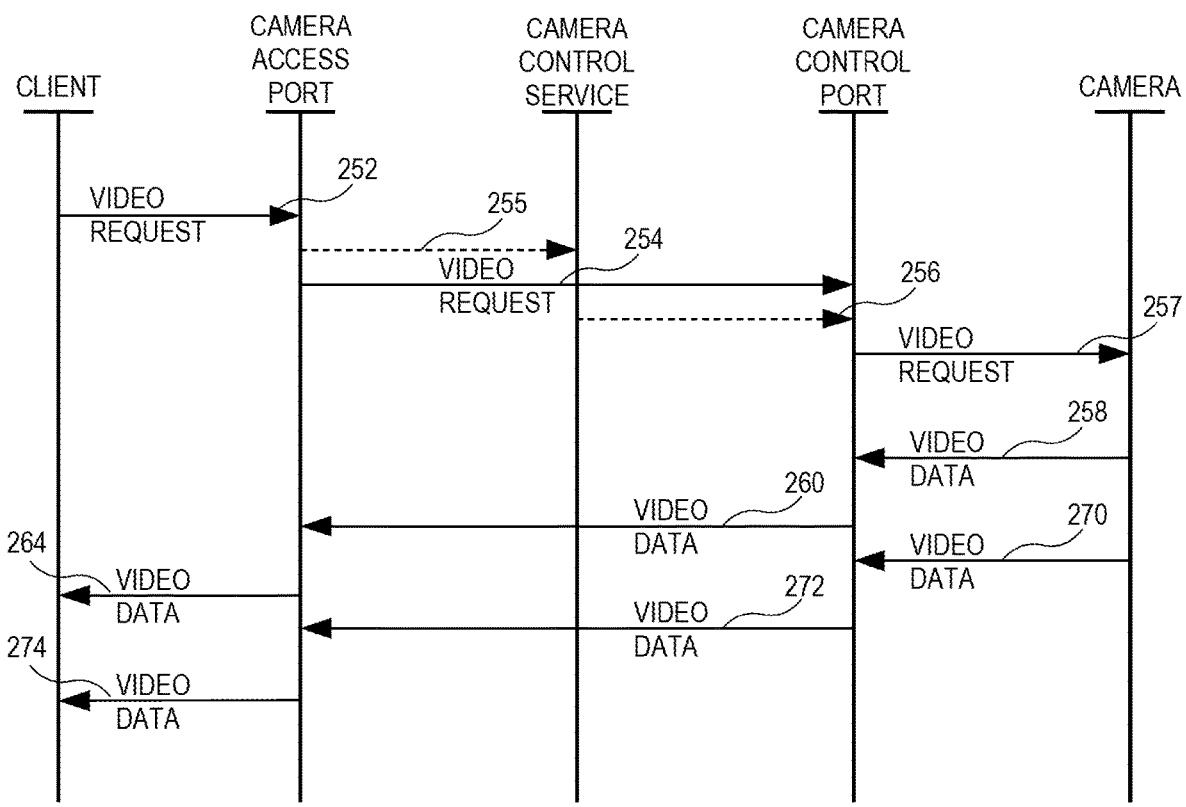
FIG. 6 is a communication diagram showing the sending of a video request from a client to a video camera and the return of video data from the video camera to the client.

In the case of the instruction message from the client 22 being a video request, then the communication may turn out as depicted in FIG. 6. A video request may be considered a peer-to-peer candidate in some embodiments and in other embodiments such a request is not considered a peer-to-peer candidate. One example of a case when you want the video request to be a peer-to-peer candidate is if latency may be an issue.

The communication in FIG. 6 starts with the client 22 sending the video request 252 to the camera access port 44. The camera access port determines if the message, in this case the video request, is of a type that is considered a peer-to-peer candidate. The camera access port determines, in some embodiments, that the video request is considered a peer-to-peer candidate and sends it 254 over the established peer-to-peer connection to the camera control port 46. In alternative embodiments the video request is not considered a peer-to-peer candidate and the video request 255, 256, via the camera control service 40 to the camera control port 46. The camera control port 46 will pass the video request 257 to the camera 10.

Then the camera will process the video request and respond by addressing requested video data to the client. The video data 258 is then sent to the camera control port 46. The camera control port 46 then identifies the data in the message sent from the camera as video data and send the video data 260 via the peer-to-peer connection to the camera access port 44, as video data is considered a peer-to-peer candidate. The camera access port then passes the video data 264 on to the client.

In most cases the video requested by the client either includes too much information for a single message or the request is of live video data which includes data not captured at the time of the request and therefore if for no other reason has to be sent in a plurality of messages. Therefore, the FIG. 6 depicts yet another video data message 270 being sent from the camera to the camera control port 26 which video data message 272 then is passed on to the camera access port 44 and then 274 to the client. The number of consecutive video data messages sent depends on how much video data that is to be sent and how much data each video data message may carry. Moreover, the amount of video data to be sent may also be influenced by how long the camera 10 is to deliver video data, e.g. in a live video situation.

Figure 7:
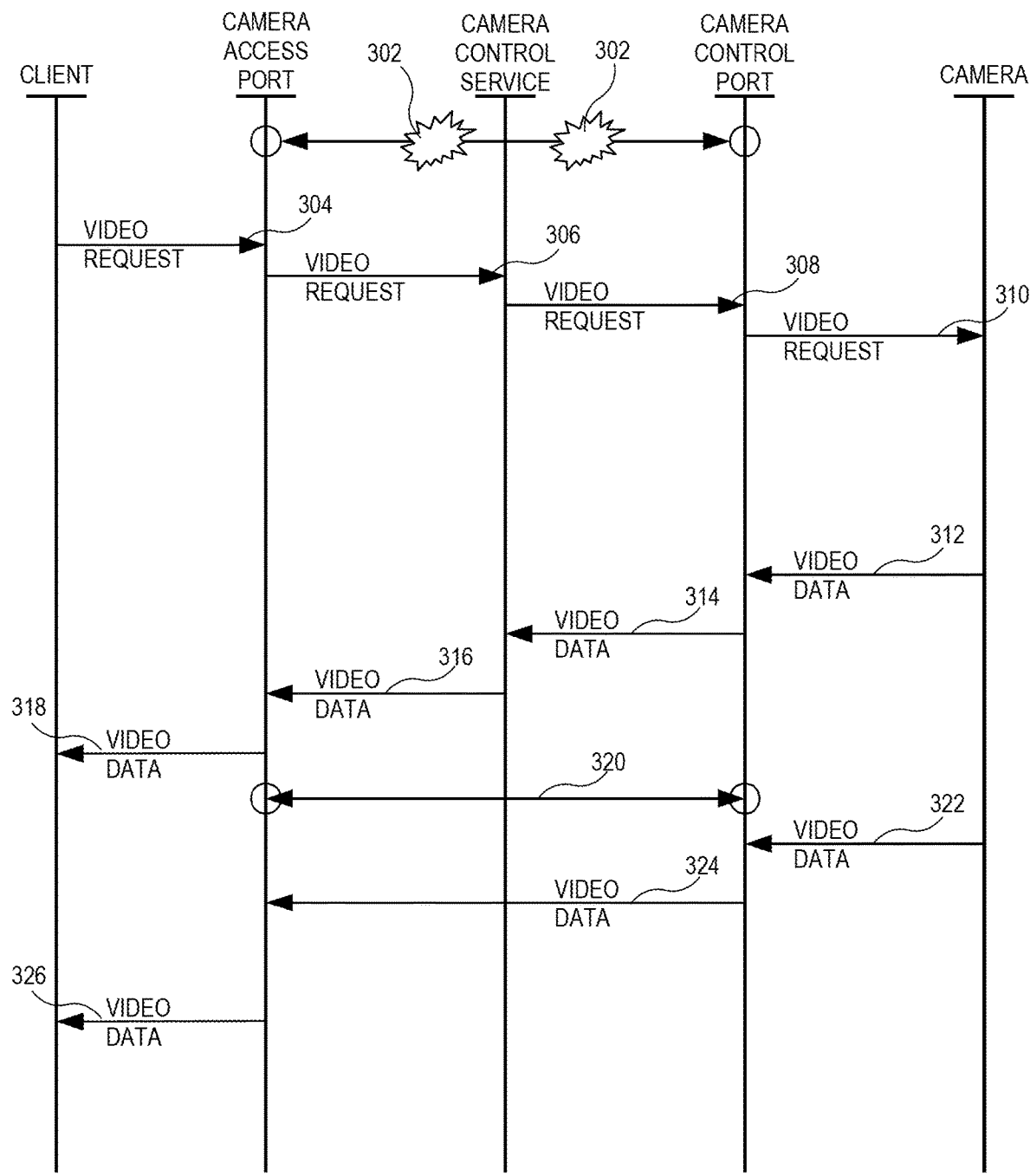
FIG. 7 is a communication diagram of a video request as described in connection with FIG. 6, with the difference that this communication diagram shows the effect of losing the peer-to-peer connection and then re-establishing it.

In the scenario described in connection with FIG. 6 it is presumed that a peer-to-peer connection is already established. However, the case may be that the peer-to-peer connection has not yet been established or it has been disrupted for some reason. Such a scenario is depicted in FIG. 7 where the peer-to-peer connection being indicated as disrupted at reference 302. The video request 304 from the client 22 is then, as in previous scenario, sent to the camera access port 44.

In the camera access port 44, assuming the camera access port 44 is of the embodiment in which the video request is considered a peer-to-peer candidate, the camera access port 44 detects that there is no peer-to-peer connection to the requested camera 10 and therefore sends the video request 306 to the camera control service 40. The camera control service then passes the video request 308 on to the camera control port 46 which in turn sends the video request 310 to the camera 10.

In response to the video request the camera 10 generates and sends a video message 312 to the camera control port 46. Since there is no peer-to-peer connection the message including video data cannot be sent via a peer-to-peer connection. The camera control port 46 is aware of this and sends the video data message 314 to the camera control service 40. The camera control service 40 passes the video data 316 on to the communication controller 26 and its camera access port 44. From the camera access port 44 the video data 318 is then sent to the client 22, where it is processed and possibly displayed. The communication for consecutive video data messages will be the same as the one described referring to the video data 312, 314, 316, 318, unless a peer-to-peer connection is established.

Reference 320 indicates the re-establishment, or an establishment, of a peer-to-peer connection and the video data 322 sent from the camera after the re-establishment of the peer-to-peer connection will then be sent to the camera control port 46 as before, but then the camera control port 46 will recognise that the peer-to-peer connection is established and send the video data 324 over the peer-to-peer connection to the camera access port 44. The video data 326 is then sent from the camera access port 44 to the client for processing. Video data transmitted after the re-establishment of the peer-to-peer connection will be sent in accordance with the video data messages 322, 324, and 326, until the peer-to-peer connection is lost again or there is no more data to send.

Figure 2:
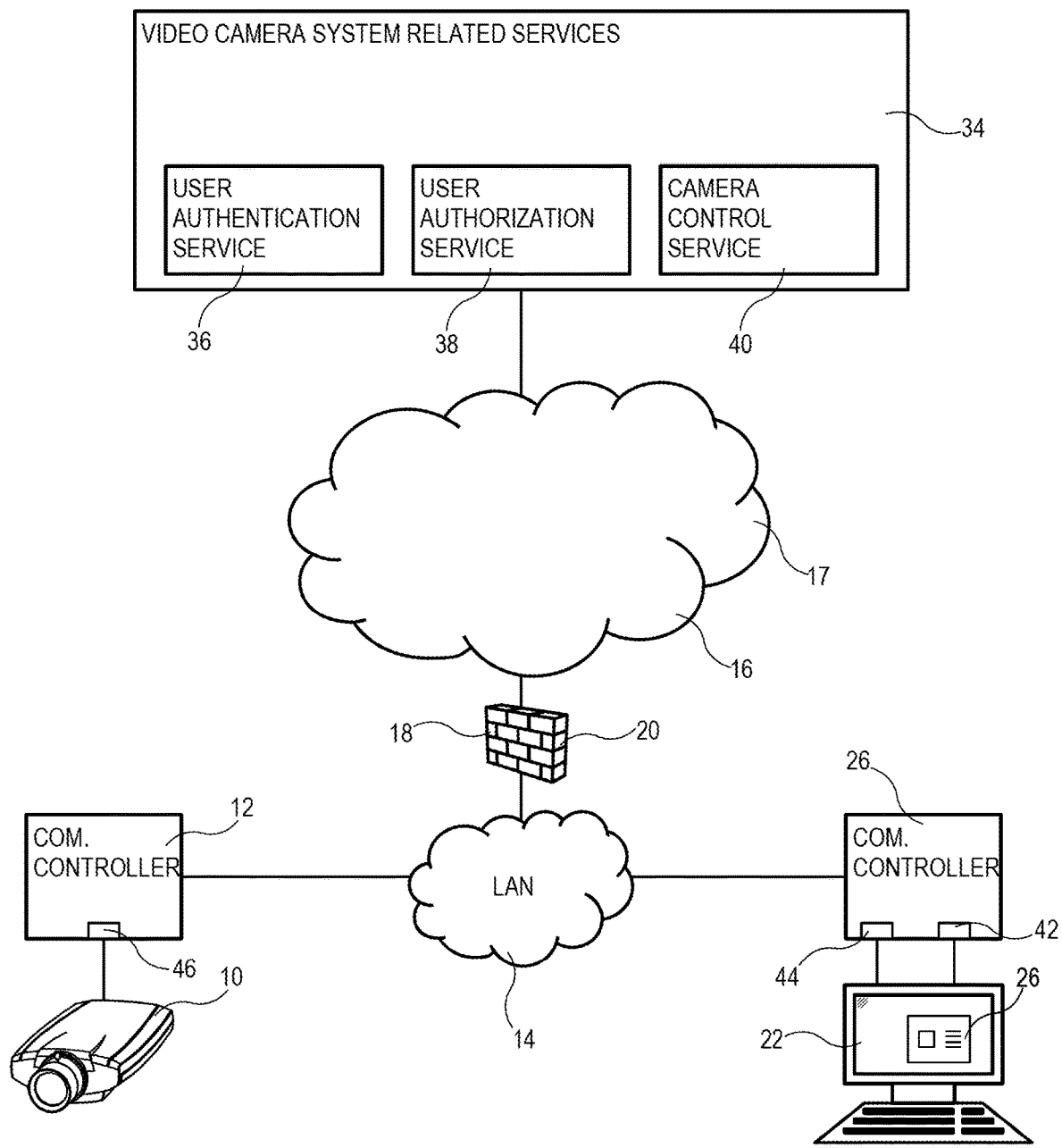
FIG. 2 is another block diagram of a video camera system.
Figure 8:
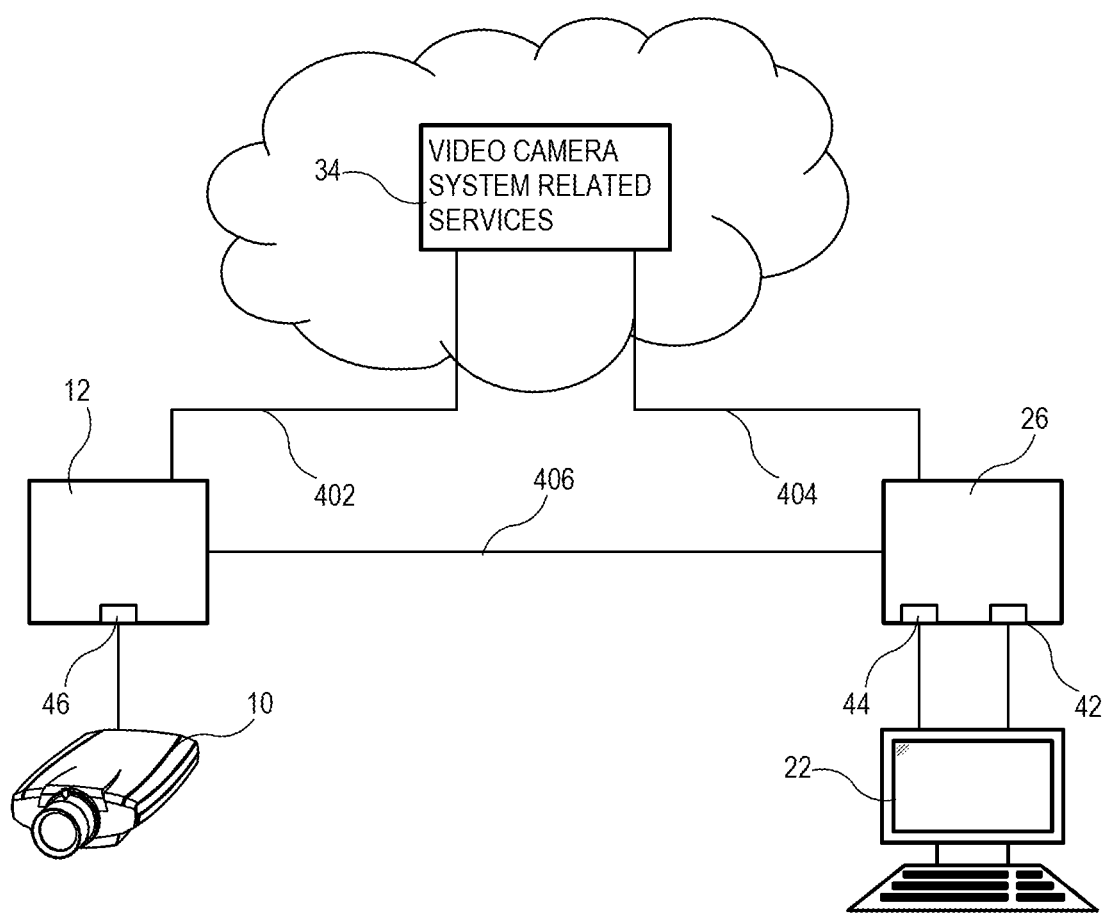
FIG. 8 is a block diagram of a video system, this specific block diagram emphasizes logical communication paths instead of the physical communication paths.

In FIG. 8 a more communication-focused picture of the connections between the devices of the system according to some embodiments is depicted. As previously described in connection with FIGS. 1 and 2, the system includes the camera 10, the communication controller 12, the camera control port 46, the client 22, the communication controller 26, the camera access port 44, and the video camera system related services 34. The video camera system related services 34 is presented inside a cloud symbol indicating that these services 34 may be implemented as cloud services or on servers dedicated for the video camera system related services, which both are described in connection with FIG. 1.

Communication paths 402 and 404 between respective communication controller and the video camera system related services 34 are established during setup of each communication controller and allow the system to provide extended services related to video camera systems in addition to the standard services of a video camera system.

A peer-to-peer connection 406 is established when possible from the time a client 22 requests access to a camera 10. The peer-to-peer connection 406 is a direct connection between the two communication controllers or the camera 10 and the client 22, respectively. The setup of the peer-to-peer connection 406 may be realise by so called "hole punching" as previously described. The process of hole punching may start as soon as the client 22 requests access to the camera 10. During the time when no peer-to-peer connection 406 has been established all communication will be relayed via the video camera system related services 34. Accordingly, the communication controllers 12, 26 will act as intelligent relays directing the communication to a desired, and in many cases an optimal, path between a client and a camera for the particular communication detected in the message to be transferred.

Implementing the video camera system related services as cloud services or on servers dedicated for the video camera system related services may permit the cloud services or servers to have greater processing power than a single client. Moreover, security functions, e.g. authentication and authorisation procedures may be shared in the system. Further, the access to the system of cameras will be facilitated. However, this video camera system related services 34 will introduce extra processing of data traffic sent between the client 22 and the camera 10 and vice versa. This extra processing will result in latencies which may lower the quality of some operations and even make some operations very difficult to control, e.g. pan, tilt, zoom. Moreover, the cloud services or the dedicated server implementations may be related to a cost for data traffic received and sent between camera and video camera system related services and between client and video camera system related services. Motion video requires a lot of data and would thereby risk being quite expensive to send via the video camera system related services. In these and other not mentioned cases it is advantageous to send the messages via a direct connection than via a service function on the network.

The above description has focused on the situation of a client communicating, accessing, and controlling a single video camera. However, the client may request to communicate, access, and control a plurality of cameras. In such cases a camera access port is configured in the communication controller at the client for each camera and each camera access port is arranged to communicate with a camera control port of the corresponding video camera in communication controllers at the video cameras.

The invention claimed is:

1. A method for remotely controlling a networked video camera from a client via a Wide Area Network (WAN) the method comprising:
   sending an instruction message, intended for the video camera, from the client to a communication controller arranged at the client;
   determining, at the communication controller arranged at the client, whether the instruction message is a candidate for being sent to the video camera via a client-camera peer-to-peer connection or not, wherein the client-camera peer-to-peer connection is a direct connection over the WLAN between the communication controller arranged at the client and a communication controller arranged at the video camera, wherein instruction messages not being candidates for being sent over the client-camera peer-to-peer connection includes at least one of the types of data from the group of: frame rate settings, aperture size settings, and gain settings, and wherein instruction messages being candidates for being sent over the client-camera peer-to-peer connection includes at least one of the types of data from the group of: video data, image data, pan adjustments, tilt adjustments, and zoom adjustments;
   in response to the instruction message being determined not to be a candidate for being sent to the video camera via the client-camera peer-to-peer connection, the method further including:
      sending the instruction message from the communication controller arranged at the client over the WAN to a camera control service;
      logging at the camera control service at least a portion of the instruction message; and
      sending the instruction message received at the camera control service from the camera control service to the video camera via the WAN; and
   in response to the instruction message being determined to be a candidate for being sent to the video camera via the client-camera peer-to-peer connection, the method further including:
      sending the instruction message from the communication controller arranged at the client to the communication controller arranged at the video camera via the client-camera peer-to-peer connection;
      sending the instruction message received by the communication controller at the video camera from the communication controller at the video camera to the video camera;
      receiving at the video camera the instruction message via one of the control service or the client-camera peer-to-peer connection; and
      performing at the video camera the instruction in the instruction message.

2. The method according to claim 1, wherein the communication controller arranged at the client is directly connected to the client and is connecting the client to the WAN.

3. The method according to claim 1, wherein the communication controller arranged at the video camera is directly connected to the video camera (10) and is connecting the video camera to the WAN.

4. The method according to claim 1, further comprising:
   sending an access request requesting access to the video camera, the access request is sent from the client to a user authorization service via the WAN;
   checking at the user authorization service if the client is authorized to access the requested video camera;
   sending, in response to the access of the video camera being authorized, an instruction message from the user authorization service to the communication controller arranged at the client instructing this communication controller to setup a camera access port communication between the client and the video camera, and
   initiating, in response to the access of the video camera being authorized, setup of the client-camera peer-to-peer connection between the camera access port and a camera control port in the communication controller arranged at the video camera.

5. The method according to claim 4, wherein the sending of an instruction message, intended to the video camera, from the client includes the client addressing the instruction message, intended to the video camera, to an IP-address identifying the camera access port.

6. The method according to claim 1, further comprising:
   in response to the instruction message received at the video camera being a video request performing the following:
      sending video data messages from the video camera to the communication controller arranged at the video camera;
      determining at the communication controller arranged at the video camera that each video data message is a candidate for being sent to the client via the client-camera a peer-to-peer connection,
      sending each video data message received at the communication controller arranged at the video camera via the client-camera peer-to-peer connection to the communication controller arranged at the client, sending each video data message received at the communication controller arranged at the client to the client for further processing.

7. The method according to claim 1, wherein the camera control service is a process running on a server accessible via the WAN.

8. A networked video monitoring system comprising:
a video camera connected to a Wide Area Network (WAN) via a communication controller arranged at the video camera;
a client arranged to manage video data from video cameras accessed via the WAN, the client being connected to the WAN via a communication controller arranged at the client;
a camera control service arranged to log instructions sent to the camera, the camera control service is implemented in a server connected to the WAN; and
the communication controller arranged at the client being arranged to:
determine whether an instruction message sent from the client and addressed to the video camera is a candidate for being sent to the camera via a client-camera peer-to-peer connection or not, wherein the client-camera peer-to-peer connection is a direct connection over the WAN between the communication controller arranged at the client and the communication controller arranged at the video camera, wherein instruction messages not being candidates for being sent over the client-camera peer-to-peer connection includes at least one of the types of data from the group of: frame rate settings, aperture size settings, and gain settings, and wherein instruction messages being candidates for being sent over the client-camera peer-to-peer connection includes at least one of the types of data from the group of: video data, image data, pan adjustments, tilt adjustments, and zoom adjustments;
send each instruction message determined not to be a candidate for being sent via the client-camera peer-to-peer connection to the camera control service; and
send each instruction message determined to be a candidate for being sent via the client-camera peer-to-peer connection to the video camera via the client-camera peer-to-peer connection.

9. The networked video monitoring system according to claim 8, wherein the communication controller arranged at the video camera is arranged to determine whether a message sent from the video camera and addressed to the client is a candidate for being sent to the client via the client-camera peer-to-peer connection or not, is arranged to send each message determined not to be a candidate for being sent via the client-camera peer-to-peer connection to the camera control service, and is arranged to send each message determined to be a candidate for being sent via the client-camera peer-to-peer connection to the client via the client-camera peer-to-peer connection.

* * * * *